United States Patent
Patil et al.

(10) Patent No.: US 8,519,057 B2
(45) Date of Patent: *Aug. 27, 2013

(54) IMPACT MODIFICATION AND FUNCTIONALIZATION OF COPOLYMERS OF OLEFINS AND DIENES

(75) Inventors: Abhimanyu Onkar Patil, Westfield, NJ (US); Stephen Zushma, Clinton, NJ (US)

(73) Assignee: ExxonMobil Chemical Patents Inc., Houston, TX (US)

( * ) Notice: Subject to any disclaimer, the term of this patent is extended or adjusted under 35 U.S.C. 154(b) by 809 days.

This patent is subject to a terminal disclaimer.

(21) Appl. No.: 11/809,693

(22) Filed: Jun. 1, 2007

(65) Prior Publication Data

US 2008/0300367 A1  Dec. 4, 2008

(51) Int. Cl.
*C08L 45/00* (2006.01)
*C08L 9/00* (2006.01)

(52) U.S. Cl.
USPC ............ 525/211; 525/210; 525/232; 525/191

(58) Field of Classification Search
USPC .................................. 525/210, 211; 526/283
See application file for complete search history.

(56) References Cited

U.S. PATENT DOCUMENTS

| | | | |
|---|---|---|---|
| 3,676,375 A * | 7/1972 | Borchert et al. | 528/419 |
| 3,725,371 A | 4/1973 | Olechowski | |
| 3,970,608 A * | 7/1976 | Furukawa et al. | 525/328.1 |
| 4,125,692 A | 11/1978 | Cheradame | |
| 4,981,605 A * | 1/1991 | Tsutsui et al. | 508/304 |
| 4,992,511 A * | 2/1991 | Yamamoto et al. | 525/97 |
| 5,155,247 A | 10/1992 | Herrmann et al. | |
| 5,191,027 A * | 3/1993 | Fujiwa et al. | 525/332.1 |
| 5,610,253 A * | 3/1997 | Hatke et al. | 526/281 |
| 6,649,707 B1 * | 11/2003 | Rhodes et al. | 525/479 |
| 6,730,736 B1 * | 5/2004 | Kaita et al. | 525/70 |

FOREIGN PATENT DOCUMENTS

| | | |
|---|---|---|
| EP | 0 380 085 | 8/1990 |
| GB | 774 765 | 5/1957 |
| GB | 993 481 | 5/1965 |
| JP | 2001-031716 A | 2/2001 |
| JP | 2001031716 * | 2/2001 |

OTHER PUBLICATIONS

KRATON Polymers flyer, 2000.*
Y. Sarazin et al., Copolymerization of Propene and 5-Vinyl-2-Norbornene: A Simple Route to Polar Poly(propylene)s$^a$; Macromolecular Rapid Communications, vol. 26, pp. 1208-1213, 2005.
F. Song et al., "Derivatization of Propene/Methyloctadiene Copolymers: A Flexible Approach to Side-Chain-Functionalized Polypropenes," Journal of Polymer Science: Part A: Polymer Chemistry, vol. 40, pp. 1484-1497, 2002.
M. C. A. van Vliet et al., "Methyltrioxohenium-catalysed epoxidation of alkenes in trifluoroethanol," Chem. Comm., pp. 821-822, 1999.
G. Soldaini, "Methyltrioxorhenium (MTO)," Synlett, No. 10, pp. 1849-1850, 2004.
Prof. Dr. W. A. Hermann et al., "Methyltrioxorhenium as Catalyst for Olefin Oxidation," Angew. Chem. Int. Ed. Engl.; vol. 30, No. 12, pp. 1638-1641, 1991.
S. Marathe et al., "Regioselective Copolymerization of 5-Vinyl-2-norbornene with Ethylene Using Zirconocene-Methylaluminoxane Catalysts: A Facile Route to Functional Polyolefins," American Chemical Society, vol. 27, pp. 1083-1086, 1994.
A.O. Patil, Functional Polyolefins, Chemical Innovation, vol. 30, No. 5, pp. 19-24, 2000.
PCT/US2008/06031, International Search Report, Oct. 16, 2008, pp. 1-4.

* cited by examiner

*Primary Examiner* — Irina Krylova
(74) *Attorney, Agent, or Firm* — Catherine L. Bell

(57) ABSTRACT

Disclosed is the preparation of compositions which are mixtures of certain types of epoxidized rigid copolymers of α-olefins and diene-derived co-monomers in combination with elastomeric diene-based polymers or copolymers. These two types of rigid and elastomeric polymeric materials are placed in a common liquid reaction medium and contacted therein with an oxidizing agent. The oxidizing agent, which can be a peroxide or peracid, epoxidizes in-situ at least a portion of the residual double bonds of the rigid copolymer and preferably also introduces hydroxyl groups, e.g., diol moieties, (or derivatives thereof such as ester groups) onto the unsaturated moieties of the elastomeric diene-based polymers or copolymers. This combination of materials which has been oxidized in-situ can then be co-precipitated to form a polymeric mixture which can be melt-molded into polyolefin materials of improved structural, thermal and mechanical properties with desirable impact resistance.

7 Claims, No Drawings

IMPACT MODIFICATION AND FUNCTIONALIZATION OF COPOLYMERS OF OLEFINS AND DIENES

FIELD OF THE INVENTION

This invention relates to impact modification and functionalization of copolymers of olefins and dienes.

BACKGROUND OF THE INVENTION

Alpha-olefins can be copolymerized with rigid cyclic olefins, such as ethylidene norbornene and dicyclopentadiene, using various polymerization catalysts. When these copolymers contain more than 30 wt. % cyclic olefins, they are typically amorphous and transparent (>90% light transmittance) and have glass transition temperatures above room temperature (>50° C.). With higher levels of cyclic olefin incorporation they have exceptionally high moduli (>2900 MPa), heat distortion temperatures (>130° C. @66 psi), and Rockwell hardness (>100). However, they have very poor notched Izod impact properties (<0.5 ft-lb/in @ room temperature) and have brittle failures in the instrumented impact test at room temperature and below (brittle failures are cracks that propagate without plastic deformation of the polymers).

Thus, without modification, cyclic olefin copolymers have too little impact resistance to be used in most structural applications, such as automotive components. To improve their impact resistance, cyclic olefin copolymers are therefore generally blended with various elastomers. However, when cyclic olefin copolymers are blended with elastomers, their flexural, tensile, and Young's moduli drop significantly. For automotive applications the ideal compounds would have good impact properties and good heat distortion temperatures, while maintaining as high as possible flexural, tensile, and Young's moduli. To accomplish these balanced properties, reinforcements are often added to toughened blends. To improve the effectiveness of the reinforcements, coupling agents, such as an epoxy resin also added in the blends.

Blending of cyclic olefin copolymers with elastomers is typically achieved by melt-mixing followed by extrusion. However, the high $T_g$s of the cyclic olefin copolymer materials (up to 160° C.) require that melt-mixing and extrusion be carried out at high temperatures (>230° C.). Thus to avoid degradation of both the base copolymer and the elastomer used as the impact modifier, it is necessary to minimize both the time and temperature of melt-mixing, yet still provide conditions that ensure good mixing between the base material and the elastomer. There is therefore significant interest in developing impact modification procedures that retain the advantageous properties of the starting polymers and avoid or minimize the need for melt mixing.

Copolymers of alpha-olefins with dienes contain residual unsaturation that can act as a "reactive hook" to allow functionalization of the copolymer. Functionalization of cyclic olefin copolymers via the residual unsaturation can increase the polarity and $T_g$ of the copolymer and is also predicted to improve interactions with fillers. Functionalized polyolefin (FPO) materials have potential usefulness for a number of commercial applications. Polyolefins which are reactive or polar can, for example, provide products for major applications, such as high temperature elastomers resistant to oil, and can also provide structural polyolefins. Polyolefins in the form of oil resistant elastomers could compete with chloroprene and nitrile rubber in oil resistant applications but could offer better high temperature performance and service life than ethylene-propylene diene rubbers at a comparable price.

Structural polyolefins could be low cost polymers with improved stiffness, strength and use temperatures that would extend the boundary of polyolefins to structural applications, for example to uses within the automotive area.

Thus, functionalization of polymers has joined copolymerization and blending as a common means of altering and optimizing the physical and mechanical properties of macromolecules. One known functionalization reaction is epoxidation, which is a stereospecific reaction in which diene polymers are reacted with an oxidizing agent such as performic acid or m-chloroperbenzoic acid. Such epoxidation reactions can provide quantitative or near-quantitative conversion of the residual diene co-monomer double bonds into oxirane groups.

For example, Marathe et al. in *Macromolecules*, Am. Chem. Soc., Vol. 27, pp. 1083-1086 (1994), disclose the synthesis of poly(ethylene-co-5-vinyl-2-norbornene) with the $CP_2ZrCl_2$ (Cp=cyclopentadienyl)-methylaluminoxane (MAO) catalyst system and the subsequent conversion of the vinyl groups in the resultant copolymer into the hydroxyl/epoxy groups. The functionalization is carried out using m-chloroperbenzoic acid as oxidizing agent.

In addition, Sarazin et al. in *Macromol. Rapid Commun.*, Vol. 26, pp. 1208-1213 (2005), disclose the copolymerization of propylene with 5-vinyl-2-norbornene (VNB). The copolymers are then converted into polar polymers via functionalization of the pendant vinyl side chains. For example, the P/VNB copolymer can be reacted with m-chloroperbenzoic acid in hot toluene to produce the epoxy-functionalized copolymer. This reference also shows reaction of the P/VNB copolymer with ozone in chloroform followed by $PPH_3$ and MEOH/HCl to produce an ester functionalized copolymer.

Japanese Published Patent Application No. JP2001-031716A, published Feb. 26, 2001, discloses the synthesis of epoxy-ethylenedicyclopentadiene (E/DCPD) copolymers having 16, 27, and 40 mole % epoxy-DCPD units and $T_g$s of, respectively, 56, 112, and 178° C. These materials are derived from E/DCPDs synthesized using a $\mu$-$(CH_2CH_2)$bis(1-indenyl)$ZrCl_2$ catalyst and having GPC molecular weights of $M_w \leq 150,000$ (versus polystyrene standards). The exemplified epoxidation of the copolymer is carried out in a toluene solvent using a premixed combination of formic acid and hydrogen peroxide as an epoxidizing agent. IR and NMR analysis of the resulting epoxidized copolymer is said to show that 100 mol % of the unsaturated bonds in the copolymer are converted to epoxy groups.

Epoxide functionalization of elastomeric copolymers is also known. For example, Song et al. in *J. Polym. Sci. Part A: Polym. Chem.*, Vol. 40, pp. 1484-1497 (2002) disclose the copolymerization of propylene with 7-methyl-1,6-octadiene, followed by chemical modification of the residual double bonds to obtain polar functionalized polyolefins. The article discusses several functionalization chemistries that include m-chloroperbenzoic acid-based epoxidation, reduction to alcohols, ozonolysis, etc.

Although epoxide functionalization can be conducted in the absence of a catalyst, the use of an epoxidation catalyst can eliminate the need for the presence of large amounts of acidic reagents and can permit the use of a hydrogen peroxide oxidizing agent. But the presence of a catalyst can also promote crosslinking or side reactions of the diene-containing copolymer and/or can also potentially degrade the hydrogen peroxide oxidizing agent which is being used along with the catalyst. Rhenium-containing catalysts have been used to epoxidize and/or hydroxylate a variety of non-polymeric alkenes. And there are a few examples in the art of catalytic oxidation being used to introduce epoxy groups into copolymers containing relatively low levels of unsaturation or unsaturation which is primarily found within the copolymer backbone.

For example, Herrmann et al. in *Angew. Chem. Int. Ed. Engl.*, Vol. 30, No. 12, 1638-1641 (1991), disclose the use of methyltrioxorhenium to catalyze epoxidation of non-polymeric alkenes with hydrogen peroxide. Alkanol reaction solvents are used for such epoxidation. Similarly, U.S. Pat. No. 5,155,247 discloses the use of ligand-bound alkyltrioxorhenium to catalyze the oxidation of non-polymeric olefinic compounds to epoxides or diols using hydrogen peroxide. Olefinic compounds oxidized include cyclooctadiene, squalene, methyl oleate, 3-methyl-1,2-butadiene, styrene and styrene derivatives.

Van Vliet et al. in *Chem Commun*, pp. 821-822 (1999), disclose methyltrioxorhenium-catalyzed epoxidation of non-polymeric, substituted and unsubstituted alkenes using hydrogen peroxide in a trifluoroethanol solvent. Alkenes such as $C_6$-$C_{10}$ alkenes, vinylcyclohexene, styrene, phenylpropene and phenylbutene are exemplified.

Moreover, in *SYNLETT*, 2004, No. 10, pp. 1849-1850 (2004), Soldaini reviews the literature relating to the use of methyltrioxorhenium (MTO) to catalyze oxidation of various compounds using hydrogen peroxide. MTO catalyzed epoxidation of non-polymeric alkenes is disclosed as are epoxidation processes which utilize small amounts of pyridine or pyridine derivatives to prevent epoxidized alkenes from being converted to corresponding diols.

Although the preceding discussion demonstrates that epoxidation has been widely used to functionalize olefins and olefin polymers, it is believed that epoxidation and/or hydroxylation has to date never been suggested as a route for effecting in-situ functionalization and impact modification of a rigid cyclic diene copolymer, such as E/DCPD, in admixture with a flexible or elastomeric copolymers derived from dienes such as 7-methyl-1,6-octadiene (MOD), 4-vinyl-1-cyclohexene (VCH), and 1,4-hexadiene. The in-situ epoxidation can be conducted on a solution of the rigid and elastomeric copolymers, thereby resulting in co-precipitation of the epoxidized (and possibly also hydroxylated) products and hence avoiding the need for the melt mixing conventionally used to effect impact modification of cyclic olefin copolymers. Moreover, the resultant epoxidized material typically retains the high and low $T_g$ values associated with the rigid and elastomeric precursors respectively. In addition, the process can be selectively controlled in such a way that the rigid cyclic olefin copolymer, such as E/DCPD, forms an epoxide, while the flexible elastomer, such as an ethylene-propylene-diene monomer (EPDM) copolymer rubber, forms epoxide ring opened products, such as diols or copolymers with both hydroxyl and ester groups.

SUMMARY OF THE INVENTION

In one aspect, the present invention provides a process for preparing a functionalized copolymer mixture having a desirable combination of thermal, rheological, and structural and other mechanical properties. Such a process comprises contacting in a common liquid reaction medium a) a rigid copolymer of an α-olefin and a rigid copolymer-forming cyclic diene, and b) a diene-based elastomeric polymer or copolymer, with an oxidizing agent under oxidation reaction conditions. These oxidation reaction conditions promote formation of oxygenated-species at the sites of the diene-derived monomer double bonds in the polymeric components while such polymeric components are present within the common liquid reaction medium.

In a preferred embodiment of this process using preferred materials, a process for preparing a polymeric composition suitable for melt-molding into structural polyolefin material is provided. Such a preferred process comprises: A) dissolving in a liquid reaction medium a rigid ethylene-dicyclopentadiene copolymer; B) co-dissolving with this ethylene-dicyclopentadiene copolymer in the common liquid reaction medium an elastomeric, diene-based polymer or copolymer; C) subjecting this common liquid reaction medium containing the ethylene-dicyclopentadiene copolymer and the elastomeric, diene-based polymer or copolymer to oxidation conditions effective to at least partially epoxidize and/or hydroxylate the rigid ethylene-dicyclopentadiene copolymer and preferably also the elastomeric, diene-based polymer or copolymer; and D) co-precipitating the resulting partially epoxidized and/or hydroxylated copolymer mixture from the common liquid reaction medium as a co-precipitated polymeric composition.

In this preferred process embodiment, the ethylene/dicyclopentadiene copolymer has: i) a dicyclopentadiene-derived monomer content of from about 25 mole % to about 45 mole %; ii) a weight average molecular weight of from about 170,000 to about 1,000,000; and iii) a glass transition temperature, $T_g$, of from about 85° C. to about 260° C.

In this preferred process embodiment, the elastomeric, diene-based polymer or copolymer component has a glass transition temperature of from about 0° C. to about −95° C. and is selected from the group consisting of ethylene/1-octene/4-vinyl-1-cyclohexene copolymers; ethylene/7-methyl-1,6-octadiene copolymers; ethylene-propylene-diene (EPDM) copolymer rubbers, 1,4-hexadiene copolymers and polybutadiene polymers.

In its composition aspects, the present invention provides an in-situ formed mixture of a) an at least partially epoxidized rigid copolymer of an α-olefin and a rigid-copolymer-forming cyclic diene co-monomer; and b) an at least partially hydroxylated, elastomeric polymer or copolymer comprising diene-derived co-monomers. In a preferred composition embodiment employing preferred types of materials, compositions are provided which are suitable for melt-molding into structural polyolefin material.

The preferred compositions herein comprise: A) an at least partially epoxidized ethylene-dicyclopentadiene copolymer; and B) an elastomeric diene-based polymer or copolymer having a glass transition temperature of from about 0° C. to about −95° C. The rigid ethylene/dicyclopentadiene copolymer has i) a dicyclopentadiene-derived monomer content of from about 25 mole % to about 45 mole %; ii) a weight average molecular weight of from about 170,000 to about 1,000,000; and iii) a glass transition temperature, $T_g$, of from about 85° C. to about 260° C.

In these preferred compositions, both the partially epoxidized, ethylene/dicyclopentadiene copolymer and the elastomeric, diene-based polymer or copolymer have been dissolved in and co-precipitated from a common liquid reaction medium. The partially epoxidized ethylene/dicyclopentadiene copolymer has been at least partially epoxidized by contacting it with an oxidizing agent within the common liquid reaction medium. Preferably the oxidizing agent also at least partially epoxidizes, but more preferably hydroxylates or esterifies, in-situ the residual unsaturation within the elastomeric, diene-based polymer or copolymer.

DETAILED DESCRIPTION OF THE INVENTION

In accordance with the present invention, combinations of a rigid olefin/cyclic diene copolymer component and a diene-based elastomeric polymer or copolymer component are functionalized in-situ within a common liquid reaction medium using certain types of oxidizing agents. The resulting copolymer mixtures, which can be recovered from the common reaction medium, have the residual unsaturation present within the polymers or copolymers after their polymerization functionalized with oxirane moieties or with other oxygen-containing polar functional groups such as hydroxyl or ester substituents. Such a functionalized copolymer mixture is thus stable, has increased glass transition temperature ($T_g$), has improved compatability with fillers or processing aids and can be fashioned into structural polyolefin material of improved stiffness, strength, temperature resistance and impact resistance. The components of such copolymer mixtures and the materials and steps used in their preparation are described in detail as follows:

Rigid Olefin/Cyclic Diene Copolymer

The rigid copolymer materials, which comprise one component of the copolymer mixtures which are oxidized in accordance with the process of the invention herein, are copolymers comprising at least one α-olefin co-monomer and at least one cyclic diene-derived co-monomer which forms a rigid copolymer with the α-olefin. Accordingly, for purposes of this invention, a "copolymer" is a material which is prepared by copolymerizing at least two different co-monomer types including the essentially present co-monomers derived from α-olefins and rigid polymer-forming cyclic dienes. One or more other different co-monomer types may also be included in the copolymers herein such that the copolymer definition includes terpolymers as well as copolymers comprising four or more different co-monomer types.

The α-olefin co-monomers used to prepare the rigid copolymer component are generally those acyclic unsaturated materials comprising $C_2$ to $C_{12}$ hydrocarbons. Such materials may be linear or branched and have one double bond in the α position. Illustrative non-limiting examples of preferred α-olefins are ethylene, propylene, 1-butene, 1-pentene, 1-hexene, 1-octene and 1-dodecene. Ethylene and propylene are preferred α-olefins with ethylene being most preferred. Combinations of α-olefins may also be used such as a combination of ethylene with 1-octene, 1-hexene and/or 1-butene. The α-olefin(s) will generally be incorporated into the rigid copolymers herein to the extent of from about 5 mole % to about 95 mole %, more preferably from about 55 mole % to about 85 mole %.

A second monomeric component of the rigid copolymers used in the oxidation process herein comprises one or more cyclic diene-derived co-monomers which are copolymerized with the α-olefin co-monomers(s) and which form copolymers with the α-olefin which are rigid. Such cyclic dienes may be either conjugated or non-conjugated.

Examples of the suitable conjugated cyclic dienes include 1,3-cycloheptadiene, 1,3-cyclooctadiene and derivatives thereof. Such conjugated cyclic dienes may be used singly or in a combination of two or more types.

Typical non-limiting examples of non-conjugated cyclic dienes useful in forming the rigid copolymers utilized in this invention are:

(a) single-ring dienes such as: 1,4-cyclohexadiene; 1,5-cyclooctadiene; and 1,5-cyclododecadiene; and (b) multi-ring fixed and fused ring dienes such as: tetrahydroindene; methyltetrahydroindene; dicyclopentadiene (DCPD); bicyclo-(2,2,1)-hepta-2,5-diene; and alkenyl, alkylidene, cycloalkenyl and cycloalkylidene norbornenes such as 5-methylene-2-norbornene (MNB), 5-ethylidene-2-norbornene (ENB), 5-propenyl-2-norbornene, 5-(4-cyclopentenyl)-2-norbornene, 5-cyclohexylidene-2-norbornene, and 5-vinyl-2-norbornene (VNB).

Preferred rigid copolymer-forming cyclic dienes include dicyclopentadiene (DCPD); 5-methylene-2-norbornene (MNB), and 5-ethylidene-2-norbornene (ENB). Dicyclopentadiene (DCPD) is the most preferred co-monomer used to form the rigid copolymers of the copolymer mixtures of this invention.

The cyclic diene-derived co-monomer will generally be incorporated into the precursor rigid copolymers herein to the extent of from about 1 mole % to about 95 mole %, more preferably from about 15 mole % to about 45 mole %.

The rigid copolymers useful in the processes and compositions herein may also optionally comprise additional ancillary co-monomers which are neither α-olefins nor dienes. Such optional ancillary co-monomers will generally be acyclic, monocyclic or polycyclic mono-olefins containing from 4 to 18 carbon atoms.

Preferred ancillary co-monomers for optional incorporation into the rigid copolymer component along with the essentially utilized α-olefin and diene co-monomers include the cyclic monoolefins such as cyclohexene and cyclooctene and the polycylic monolefins such as those described in U.S. Pat. No. 6,627,714, incorporated herein by reference. Specific examples of such polycylic monolefins include 2-norbornene, 1,4,5,8-dimethano-1,2,3,4,4a,5,8,8a-octahydronaphthalene, 5-methyl-2-norbornene, 5-ethyl-2-norbornene, 5-propyl-2-norbornene, 5-phenyl-2-norbornene, 5-benzyl-2-norbornene, 5-chloro-2-norbornene, 5-fluoro-2-norbornene, 5-chloromethyl-2-norbornene, 5-methoxy-2-norbornene, 7-methyl-2-norbornene, 5-isobutyl-2-norbornene, 5,6-dimethyl-2-norbornene, 5,5-dichloro-2-norbornene, 5,5,6-trimethyl-2-norbornene, 5,5,6-trifluoro-6-trifluoromethylnorbornene, 2-methyl-1,4,5,8-dimethano-1,2,3,4,4a,5,8,8a-octahydronaphthalene, 2-ethyl-1,4,5,8-dimethano-1,2,3,4,4a,5,8,8a-octahydronaphthalene and 2,3-dimethyl-1,4,5,8-dimethano-1,2,3,4,4a,5,8,8a-octahydronaphthalene. The most preferred optional ancillary co-monomers for use in preparing the precursor copolymers are 2-norbornene and 5-methyl-2-norbornene.

The introduction of a third type of ancillary co-monomer into the rigid copolymers used herein permits one to adjust the thermal, optical or rheological characteristics (such as glass transition temperature) of these rigid copolymers independently of the extent of functional characteristics of the copolymers introduced via epoxidation of the residual double bonds of the diene-derived co-monomers. The resulting copolymer materials containing these ancillary co-monomers are can thus be characterized as terpolymers comprising three distinct types of co-monomers within their polymer structure. If utilized, the optional ancillary co-monomers will generally comprise from about 5 mole % to about 85 mole %, more preferably from about 10 mole % to about 80 mole %, of the rigid copolymers used in the oxidation processes herein.

The rigid olefin/cyclic diene copolymer component used in the present invention will generally have a weight average molecular weight, $M_w$, of greater than about 170,000 g/mol as measured versus polystyrene standards by Gel Permeation Chromatography analysis. More preferably, the rigid copolymer component of the copolymer mixtures herein will have an $M_w$ of greater than about 175,000, even more preferably greater than about 180,000, most preferably greater than about 200,000 g/mol. There is no theoretical upper limit to rigid copolymer molecular weight but as a practical matter such materials will be no greater than about 1,000,000 or even 900,000 g/mol. As noted, weight average molecular weight for these copolymer materials can be determined in standard fashion using Gel Permeation Chromatography.

The rigid olefin/cyclic diene-derived copolymer component of the present invention generally comprise amorphous materials. As used herein, an amorphous polymer is defined to be a polymeric material having little or no crystalline component, as evidenced by no discernible melting temperature ($T_m$) in its second heat Differential Scanning Calorimetry (DSC) spectrum, or a polymeric material having a crystalline component that exhibits a second heat DSC $T_m$ with a heat of fusion ($\Delta H_f$) of less than 0.50 J/g.

The amorphous rigid olefin/cyclic diene copolymers used herein are materials which generally have certain glass transition temperature ($T_g$) characteristics. A simplistic view of the glass transition temperature of a polymeric material is the temperature below which molecules therein have very little mobility. On a larger scale, polymers are rigid and brittle below their glass transition temperature and can undergo plastic deformation above it. $T_g$ is usually applicable to amorphous phases such as the copolymers of and used in the present invention.

As noted, the glass transition temperature of the copolymer components herein is related to the softening point of the material and can be measured via a variety of techniques as discussed in INTRODUCTION TO POLYMER SCIENCE AND TECHNOLOGY: AN SPE TEXTBOOK, by H. S. Kaufman and J. Falcetta, (John Wiley & Sons, 1977) and POLYMER HANDBOOK (J. Brandup and E. H. Immergut, editors, John Wiley & Sons, 1989). The DSC techniques utilized in connection with the present invention are well known in the art and are described hereinafter in the Test Methods section.

The rigid olefin/cyclic diene copolymers used herein will generally exhibit a glass transition temperature, $T_g$, of from about 85° C. to about 260° C. At such $T_g$ values, these materials can suitably be used as engineering thermoplastics. More preferably the $T_g$ of the rigid olefin/cyclic diene copolymers used herein will range from about 87° C. to about 129° C., most preferably from about 88° C. to about 128.5° C. The olefin/cyclic diene copolymers hereinbefore described are, in fact, defined as "rigid" for purposes of the present invention if they exhibit the glass transition temperature, i.e., $T_g$, values falling within the ranges specified herein.

The olefin/cyclic diene copolymers used in this invention can be produced via a polymerization reaction which takes place by contacting an α-olefin such as ethylene with a polymerization mixture containing the cyclic diene co-monomer. The polymerization reaction is promoted by a catalyst or catalyst system and can take place under a conventional set of polymerization reaction conditions.

Any conventional type of polymerization process may be used to produce the olefin/cyclic diene copolymers. Polymerization methods include high pressure, slurry, bulk, suspension, supercritical, or solution phase, or a combination thereof. Preferably solution phase or bulk phase polymerization processes are used.

A wide variety of transition metal catalyst compounds, e.g., metallocenes, are known which, when activated with a suitable activator, will polymerize olefinic monomers selectively to produce either crystalline polymers or amorphous polymers or copolymers. A full discussion of such compounds can be found in PCT Patent Publication No. WO 2004/046214, Published Jun. 3, 2004, the entire contents of which are incorporated herein by reference.

Diene-Based Elastomeric Polymer or Copolymer

A second essential component of the copolymer mixtures prepared in accordance with the present invention comprises a flexible (or elastomeric), diene-based polymer or copolymer. When such elastomeric materials are copolymers, the term "copolymer" has the same meaning as hereinbefore described with respect to the rigid olefin/cyclic diene copolymers. Thus an elastomeric "copolymer" component is any material which is prepared by copolymerizing at least two different co-monomer types, including the essentially present co-monomers derived from dienes. Again, one or more other different co-monomer types may also be included in the elastomeric copolymers herein such that the copolymer definition includes terpolymers as well as copolymers comprising four or more different co-monomer types.

The elastomeric component of the copolymer mixtures used herein are polymers or copolymers which must contain at least one monomer type which is derived from a diene. A wide variety of diene types may be utilized to form this elastomeric polymeric component of the copolymer mixtures herein provided the resulting polymer or copolymer is elastomeric or flexible. The dienes used to prepare this elastomeric polymeric component can, for example, be conjugated or non-conjugated, cyclic or acylic, straight chain or branched. The proportion of the diene-derived monomers in such elastomeric polymeric materials can range from about 1 mole % to 100 mole %. More preferably, the elastomeric component of the copolymer mixtures herein will be diene-based copolymers having a diene-derived monomer content of from about 2 mole % to about 90 mole %.

Examples of the suitable conjugated dienes include cyclic conjugated dienes such as 1,3-cyclopentadiene, 1,3-cyclohexadiene, and derivatives thereof, and linear conjugated dienes such as isoprene, 1,3-butadiene, 1,3-pentadiene, 1,3-hexadiene, and 2,3-dimethyl-1,3-butadiene. Such conjugated dienes may be used singly or in a combination of two or more types.

Typical non-limiting examples of non-conjugated dienes useful in preparing the elastomeric polymeric materials used herein include:
 (a) straight chain acyclic dienes such as 1,4-hexadiene and 1,6-octadiene;
 (b) branched chain acyclic dienes such as 5-methyl-1,4-hexadiene; 3,7-dimethyl-1,6-octadiene; 3,7-dimethyl-1,7-dioctadiene; and the mixed isomers of dihydromyrcene and dihydro-ocimene;
 (c) α,ω-dienes which contain from 8 to 12 carbon atoms including 1,6-heptadiene, 1,7-octadiene, 1,8-nonadiene, 1,9-decadiene, 1,10-undecadiene, 1,11-dodecadiene, 1,12-tridecadiene, 1,13-tetradecadiene, and the like; and
 (d) single-ring dienes such as: 1,4-cyclohexadiene; 1,5-cyclooctadiene; and 1,5-cyclododecadiene;
 (e) alkenyl-, alkylidene-, cycloalkenyl- and cycloalkylidene-substituted single ring cyclic dienes such as 4-vinyl-1 cyclohexene; and
 (f) multi-ring fixed and fused ring dienes such as: tetrahydroindene; methyltetrahydroindene; and alkenyl, alkylidene, cycloalkenyl and cycloalkylidene norbornenes such as 5-methylene-2-norbornene (MNB), 5-(4-cyclopentenyl)-2-norbornene, and 5-vinyl-2-norbornene (VNB).

Preferably, the flexible or elastomeric component of the copolymer mixtures of this invention will be copolymers of dienes with other monomer types. One of the most common of these other monomer types comprises α-olefins. As with the rigid olefin/cyclic diene copolymer component, the α-olefin co-monomers used to prepare the flexible copolymer component can likewise generally include those acyclic unsaturated materials comprising $C_2$ to $C_{20}$ hydrocarbons. Such materials may be linear or branched and have one double bond in the α position. Illustrative non-limiting examples of preferred α-olefins are ethylene, propylene, 1-butene, 1-pentene, 1-hexene, 1-octene and 1-dodecene, 1-tetradecene, 1-hexadecene, 1-octadecene, and 1-eicosane. Ethylene and propylene are preferred α-olefins with ethylene being most preferred. Combinations of α-olefins may also be used such as a combination of ethylene with 1-octene, 1-hexene and/or 1-butene. If used as a co-monomer, the α-olefin(s) will generally be incorporated into elastomeric copolymers herein to the extent of from about 5 mole % to about 95 mole %, more preferably from about 55 mole % to about 85 mole %.

Other types of olefins may also be utilized in combination with the essentially utilized diene monomers in forming elastomeric copolymers useful in the copolymer mixtures of this invention. Such other types of potentially useful olefinic monomers include styrene and its derivatives. Other types of co-monomers which can be incorporated into elastomeric copolymers useful herein include those same acyclic, monocyclic or polycyclic mono-olefins containing from 4 to 18 carbon atoms which are described and characterized hereinbefore as "ancillary co-monomers" suitable for incorporation into the rigid copolymer component of this invention. Co-monomers which are derived neither from dienes nor α-olefins, if present, will frequently comprise from about 5 mole % to about 85 mole % of such elastomeric copolymers. Elastomeric copolymers, including terpolymers, which may be used herein can be random copolymers or block copolymers.

The most preferred types of elastomeric polymeric materials for use in the copolymer mixtures herein are of three basic types. These threes types are the polymerized conjugated linear dienes, olefin/nonconjugated diene copolymers, and aromatic vinyl/conjugated diene copolymers.

Polymerized conjugated linear dienes include materials formed by polymerization of such monomers as isoprene and 1,3-butadiene. Preferred polyisoprenes and polybutadienes range in molecular weight ($M_w$) from about 20,000 to about 500,000, more preferably from about 40,000 to about 200,000.

Preferred olefin/nonconjugated diene copolymers will generally comprise a nonconjugated diene component and at least two components selected from the group consisting of an ethylene component and alpha-olefin components having 3 to 20 carbon atoms. Examples of materials of this type include ethylene-propylene-diene (EPDM) copolymer rubbers, ethylene-α-olefin-diene copolymer rubbers or a propylene-α-olefin-diene copolymer rubber. In such copolymer rubbers, the α-olefin can be selected from 1-butene, 1-pentene, 1-hexene, 4-methyl-1-pentene, 1-octene and 1-decene. The diene in such copolymer rubbers can be selected from 1,4-hexadiene; 1,6-octadiene; 2-methyl-1,5-hexandiene; 6-methyl-1,5-heptadiene; 7-methyl-1,6-octadiene; cyclohexadiene; dicyclopentadiene; methylterahydroindene; 5-vinylnorbornene; 5-ethylidene-2-norbornene; 5-methylene-2-norbornene; 5-isopropyldiene-2-norbornene; 6-chloromethyl-5-isopropenyl-2-norbornene; 2,3-diisopropylidene-5-norbornene; 2-ethylidene-3-isopropylidene-5-norbornene; and 2-propenyl-2,2-norbornadiene. Copolymer rubbers of this type will frequently range in molecular weight ($M_w$) from about 20,000 to about 500,000.

Preferred aromatic vinyl copolymers are those selected from random copolymers and block copolymers each comprising an aromatic vinyl hydrocarbon component and a conjugated diene component. These include (a) styrene-butadiene copolymer rubbers, (b) styrene-butadiene-styrene copolymer rubbers, (c) styrene-isoprene block copolymer rubbers, and (d) styrene-isoprene-styrene block copolymer rubbers. Copolymer rubbers of this type will frequently range in molecular weight ($M_w$) from about 20,000 to about 500,000.

The flexible or elastomeric diene-based polymers and copolymers used herein will generally exhibit a glass transition temperature, $T_g$, of from about 0° C. to about −95° C. More preferably the $T_g$ of these elastomeric materials used herein will range from about −10° C. to about −80° C., most preferably from about −20° C. to about −70° C. The diene-based polymers and copolymers hereinbefore described are, in fact, defined as "flexible" or "elastomeric" for purposes of the present invention if they exhibit the glass transition temperature, i.e., $T_g$, values falling within the ranges specified hereinbefore for these materials.

The elastomeric polymers and copolymers used in the present invention are conventional materials and can be prepared using any of the polymerization procedures known in the art to be useful for synthesis of materials of this type. Polymer and copolymer properties such as $T_g$, molecular weight, diene content, etc., can be adjusted by selecting appropriate reactant types, reactant concentrations, and polymerization reaction conditions to realize any desired set of elastomer characteristics.

Common Liquid Reaction Medium

To carry out the polyolefin functionalization process of the present invention, the rigid copolymer of an α-olefin and a rigid copolymer-forming cyclic diene, and the diene-based elastomeric polymer or copolymer component, both as hereinbefore described, are placed together in a common liquid reaction medium. Such a liquid reaction medium is generally one in which both of the polymeric components will be susceptible to oxidation with the oxidizing agent which is also to be added to the common liquid reaction medium. Thus the common liquid reaction medium will generally comprise a suitable diluent (e.g., a reaction solvent) in which the reactants and other adjuncts such as catalyst materials can be dissolved, suspended or dispersed. (For purposes of the present invention, a liquid which does not participate in the reaction as a reactant and which forms the common liquid reaction medium is referred to herein as a "diluent" or a "reaction solvent" even though not all of the materials within the reaction medium will necessarily be completely dissolved in or miscible with such a liquid.)

Suitable diluents or reaction solvents include organic liquids which are inert in the reaction mixture. By "inert" as used herein in conjunction with diluents or reaction solvents is meant that the diluent or solvent does not deleteriously affect the oxidation, e.g., epoxidation or hydroxylation, reaction relative to its absence and does not increase the formation of non-oxidized reaction products.

Such suitable inert organic diluents include aromatic hydrocarbons such as benzene, toluene, xylene, benzonitrile, nitrobenzene, adiponitrile, anisole, phenyl nonane; saturated aliphatic hydrocarbons having from about 5 to about 20 carbons, such as pentane, hexane, heptane adiponitrile; halogenated hydrocarbons such as methylene chloride, 1,2-dichloroethane, chloroform, carbon tetrachloride and the like; fluorinated or non-fluorinated, substituted saturated aliphatic and/or aromatic oxygenate compounds having from about 1 to about 20 carbons including those selected from the group consisting of alcohols such as: methanol, propanol, butanol, isopropanol, 2,4-di-t-butyl phenol; ketones such as acetone; carboxylic acids such as propanoic acid, acetic acid; esters such as ethyl acetate, ethyl benzoate, dimethyl succinate, butyl acetate, tri-n-butyl phosphate; dimethyl phthalate; and ethers, such as tetraglyme. Mixtures or blends of diluents or solvents may also be utilized herein to form the common liquid reaction medium.

Preferred organic diluents include toluene and chloroform. Chloroform is especially preferred. The common liquid reaction medium may also comprise water. Water, for example, may be introduced as a carrier for an $H_2O_2$ oxidizing agent.

Another preferred type of organic diluent for use in the oxidation process herein comprises perfluorinated alcohols. Such preferred perfluorinated alcohol reaction solvents can be selected from the group consisting of hexafluoroisopropanol, tetrafluoropropanol, pentafluoropropanol, hexafluorophenylpropanol, perfluorobutyl alcohol, octafluoropentanol, hexafluor-2-propanol, pentafluoro-1-propanol, tetrafluorophenol, trifluorophenol, difluorophenol, tetrafluoro-1-propanol, 4-(trifluoromethyl)benzyl alcohol, 2,2,2-trifluoroethanol, 2,4,5-trifluorophenol, 2,4-difluorobenzyl alcohol, 2,4-difluorophenol, 4-fluorobenzyl alcohol, 2,2,3,3,3-pentafluoro-1-propanol, 2-(perfluorobutyl)ethanol, 2-(perfluorohexyl)ethanol, 2-(perfluorooctyl)ethanol, 2-(perfluorodecyl)ethanol, 2-perfluor-3-methylbutyl)ethanol, 1H,1H,3H-tetrafluoro-1-propanol, 1H,1H,5H-octafluoro-1-pentanol, 1H,1H,7H-dodecafluoro-1-heptanol, 1H,1H,9H-hexadecafluoro-1-nonanol, 2H-hexafluoro-2-propanol, and 1H,1H,3H-hexafluoro-2-butanol.

Within the common liquid reaction medium, the rigid copolymer of an α-olefin and a rigid copolymer-forming cyclic diene, and the diene-based elastomeric polymer or copolymer will be added in accordance with the present invention in amounts relative to each other which depend on the desired properties and intended use of the copolymer mixture which is eventually functionalized within the reaction medium. For functionalized copolymer mixtures which are useful as impact-modified structural polyolefins, the weight ratio of rigid olefin/diene copolymer to elastomeric diene-based polymer or copolymer will generally range from about 99:1 to about 50:50, within the common liquid reaction medium. More preferably, the weight ratio of rigid olefin/diene copolymer to elastomeric diene-based polymer or copolymer will range from about 95:5 to about 60:40, within the common liquid reaction medium.

The total amount of the rigid and elastomeric polymeric materials to be functionalized in-situ, relative to the total amount of common liquid reaction medium, e.g., the organic reaction diluent or solvent, can vary widely. Enough of the organic reaction solvent will generally be utilized in order to completely dissolve or uniformly suspend or disperse the rigid and elastomeric polymeric reactants within the liquid reaction medium. Frequently, the rigid and elastomeric polymeric materials to be functionalized will comprise from about 0.5 wt % to about 40 wt % of the total common liquid reaction medium. More preferably, the rigid and elastomeric polymeric materials to be functionalized will comprise from about 1 wt % to about 20 wt % of the total common liquid reaction medium.

Oxidizing Agents

To carry out the process for preparing an in-situ functionalized copolymer mixture, the combination of rigid olefin/diene copolymer and elastomeric diene-based polymer or copolymer is contacted within the common liquid rection medium with effective amounts of a suitable oxidizing agent which serves to introduce oxygen-containing functional groups onto the polymeric materials at the sites of residual unsaturation within these two types of polymeric materials. Suitable oxidizing agents include various peroxides and peracids which serve to bring about the oxidation reaction.

Peracids are one type of preferred epoxidizing agent. Peracids such a 3-chloroperbenzoic acid may be added as such to the common liquid reaction medium. Alternatively, peracids may be formed in-situ within the reaction mixture. A preferred method of peracid formation in-situ involves the addition to the reaction mixture of a combination of both hydrogen peroxide and formic acid. Formic acid can be added in a mole ratio to the functionalizable double bonds of the polymers to be functionalized of from about 10:1 to about 30:1. Hydrogen peroxide can be added to the reaction mixture in a mole ratio to these functionalizable double bonds of from about 1.01:1 to about 5:1. Addition of both $H_2O_2$ and formic acid to the common liquid reaction medium results in the in-situ formation of performic acid as an oxidizing, e.g., epoxidizing or hydroxylating, agent. When both $H_2O_2$ and formic acid are added, the molar ratio of hydrogen peroxide to formic acid can range from about 1:1 to about 1:100.

Another preferred type of oxidizing agent for use in the process herein is hydrogen peroxide itself. Hydrogen peroxide has the chemical formula $H_2O_2$ and is a strong oxidizing agent. It is a raw material which is readily commercially available in a variety of forms.

Hydrogen peroxide can be used in the process herein in the form of an aqueous solution with a hydrogen peroxide content of from about 1 wt % to about 90 wt %, more preferably from about 10 wt % to about 80 wt % and even more preferably from about 30 wt % to about 70 wt %. The hydrogen peroxide may be used in the form of a commercially available, stabilized solution. Suitable sources of peroxide are unstabilized, aqueous hydrogen peroxide solutions such as are obtained in the anthraquinone process for producing hydrogen peroxide. Hydrogen peroxide solutions in methanol which are obtained by reacting hydrogen and oxygen in the presence of a noble metal catalyst in a methanol solvent may also be used.

If hydrogen peroxide alone is used as the oxidizing agent in the process herein, it will generally be employed in conjunction with an oxidation catalyst. A number of different types of oxidation catalysts are known to promote epoxidation and/or hydroxylation of unsaturated compounds. Such catalysts include, for example, titanium siliocates, peroxophosphotungstates, and manganese triazocyclononane.

One preferred type of oxidation catalyst for use herein in conjunction with a hydrogen peroxide oxidizing agent to functionalize the polymeric combinations herein comprises an alkyl trioxorhenium-based material. Generally the alkyl group in the rhenium complex of such a catalyst will contain from 1 to 4 carbon atoms. Most preferably, this alkyl group will be methyl.

Methyltrioxorhenium has the formula $CH_3ReO_3$ and has the structure depicted by Structure (I) as follows:

(I)

Methyltrioxorhenium is hereinafter designated as "MTO". MTO is a known catalyst material which has been widely studied as an oxygen transfer reagent in oxidation reactions involving a variety of substrates. The important features of MTO as a catalyst include its ease of synthesis, its commercial availability and it stability to air.

MTO reacts with $H_2O_2$, one suitable oxidizing agent used in the process herein, to give equilibrium with formation of monoperoxo- and diperoxo-rhenium (VII) species as shown in the following reaction scheme:

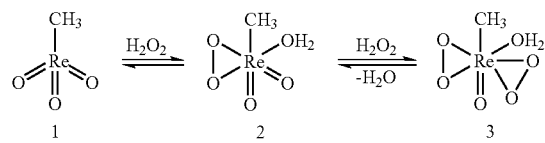

The diperoxo-rhenium (VII) species (Structure 3 of the above $H_2O_2$ activation scheme) is the most reactive towards oxygen-accepting substrates such as the rigid α-olefin/diene copolymers and the diene-based elastomers which are epoxidized and hydroxylated via the process herein.

The MTO/$H_2O_2$ system involves nontoxic reagents. The oxidation and work-up procedures are relatively simple, and water is the only byproduct. Furthermore, MTO does not decompose $H_2O_2$ (unlike many transition metal-based catalysts).

The MTO/$H_2O_2$ system has relatively high acidity, and such high acidity can promote hydrolysis of epoxidized products to hydroxylated, diol products. Accordingly, when the epoxidized copolymer is the desired primary reaction product, it may be appropriate to add one or more basic ligands to the MTO complex. Such basic ligands can, for example, be nitrogen-containing compounds such as ammonia or primary, secondary or tertiary amines including those described in U.S. Pat. No. 5,155,247, incorporated herein by reference. Such ligands can be reacted with the MTO complex prior to the introduction of the MTO-based catalyst into the common liquid reaction medium used in the process herein. Alternatively, ligand forming-compounds such as pyridine, bipyridine or other pyridine derivatives can be added to the common liquid reaction medium along with the reactants, MTO catalyst and reaction solvents.

Whether the functionalization of the polymeric materials herein involves epoxidation or hydroxylation, the initial concentration of the hydrogen peroxide oxidizing agent used will generally range from about 1 to about 100 moles of hydrogen peroxide oxidizing agent for every mole of olefinic carbon-carbon double bonds within the copolymer mixture to be subjected to oxidation. More preferably, from about 1.05 to about 10 moles of $H_2O_2$ are added to the common liquid reaction medium per mole of unsaturated copolymer double bonds in the copolymer mixture.

Whether the process involves epoxidation or hydroxylation or both, the oxidation catalyst, if used, will generally be added to the common liquid reaction medium in a concentration of from about 0.0001 to about 1 mole of catalyst for every mole of olefinic carbon-carbon double bonds within the copolymeric mixture to be subjected to oxidation. More preferably, from about 0.001 to about 0.1 mole of a catalyst which is alkyl-trioxorhenium-based will be added per mole of unsaturated copolymer or polymer double bonds.

Reaction Conditions

In one aspect of the present invention, the mixtures of rigid α-olefin/diene copolymers and elastomeric diene-based polymeric materials as hereinbefore described are converted using the oxidizing agent and optionally catalyst materials also hereinbefore described to epoxidize copolymers by subjecting the common liquid reaction medium containing these reactants to reaction conditions which convert from about 50% to 100% of the double bonds in the diene-derived co-monomers to oxirane groups. Certain types and concentrations of reactants and catalysts, as well as relatively lower reaction temperatures and relatively shorter reaction times, tend to favor conversion of the unsaturated copolymers to epoxidized copolymers.

In another aspect of the present invention, the mixtures of rigid α-olefin/diene copolymers and elastomeric diene-based polymeric materials as hereinbefore described are converted using the oxidizing agents and optional catalyst materials also hereinbefore described to hydroxylated copolymers by subjecting the common liquid reaction medium containing these reactants to reaction conditions which convert from about 50% to 100% of the double bonds in the diene-derived co-monomers to diol moieties. (One or both of the hydroxyl groups in such diol moieties can be further converted to other oxygen-containing functional moieties such as ester, ether or acid groups.) Certain types and concentrations of reactants and catalysts, as well as relatively higher reaction temperatures and relatively longer reaction times, tend to favor conversion of the unsaturated copolymers to hydroxylated, diol-containing functionalized copolymers.

In yet a third aspect of the present invention, there are also some selected reaction conditions which will convert from about 50% to 100% of the double bonds in the diene-derived co-monomers in the unsaturated polymers and copolymers being functionalized to both oxirane groups and hydroxyl, e.g., diol, moieties. Such reaction conditions are those which are intermediate to the conditions which promote formation of either all oxirane groups or all hydroxyl, diol or diol-derived groups within such functionalized copolymers.

It is also possible to selectively control the process herein in such a way that the rigid α-olefin/diene copolymer forms an epoxide while the flexible elastomeric polymer or copolymer forms ring-opened materials having hydroxyl or other oxygen-containing functional groups such as ester moieties at the site of the diene-derived co-monomers within the elastomeric diene-based polymers or copolymers. A typical functionalization reaction of this type involving in-situ functionalization of a combination of, for example, an ethylene dicyclopentadiene (E/DCPD) rigid copolymer and an ethylene/octane/vinylcyclohexene (E/O/VCH) elastomer is shown in the following reaction Scheme 1:

Scheme 1. In-situ functionalization of E/DCPD and E/O/VCH copolymers

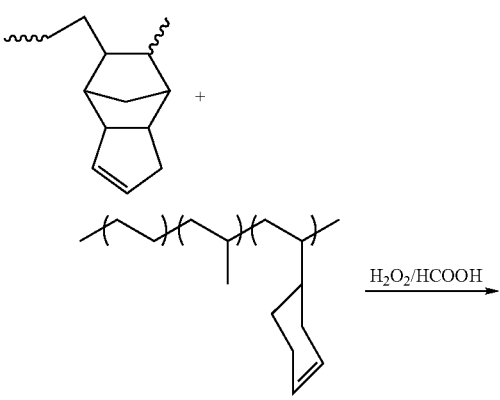

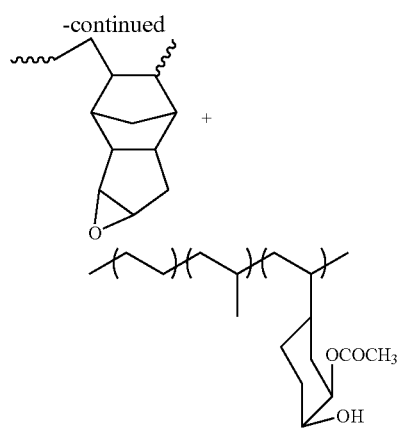

Olefin/diene copolymers containing comonomers derived from both flexible dienes and rigid dienes, and also optionally from ancillary olefinic terpolymer-forming comonomers, can be oxidized to epoxidized copolymers by using relatively mild reaction temperatures and relatively short reaction times. For the epoxidation embodiments of the present process, temperature of the reaction medium will generally range from about 20° C. to about 70° C., more preferably from about 25° C. to about 50° C. For production of epoxidized polymeric materials, reaction times will generally range from about 0.1 to about 24 hours, more preferably from about 0.5 to about 18 hours.

Olefin/diene copolymers, and especially ethylene/diene copolymers, containing co-monomers derived from rigid dienes, and also optionally from ancillary olefinic terpolymer-forming comonomers, can be oxidized to hydroxylated, i.e., diol-containing, functionalized copolymers by using relatively higher reaction temperatures and relatively longer reaction times. For the hydroxylation embodiments of the present process, temperature of the common liquid reaction medium will generally range from about 50° C. to about 100° C., more preferably from about 60° C. to about 80° C. For production of hydroxylated polymeric materials, reaction times will generally range from about 1 to about 48 hours, more preferably from about 2 to about 36 hours.

Oxidation process embodiments of the present invention can be carried out using one or more of the foregoing reaction condition parameters in areas where ranges for these parameters overlap for epoxidation and hydroxylation. Conducting the oxidation process in this manner can produce functionalized olefin/diene copolymers containing both oxirane and diol or other oxygen-containing functionalities.

In-Situ-Formed Polymeric Compositions

In its composition aspects, the present invention relates to polymeric compositions, e.g., mixtures, which are combinations of (a) epoxidized rigid copolymers of an α-olefin and a rigid copolymer-forming diene, and (b) an optionally hydroxylated, elastomeric diene-based polymer or copolymer. Such polymeric combinations are formed by dissolving, suspending or dispersing the rigid and elastomeric polymeric materials described hereinbefore in a common liquid reaction medium and by contacting these materials in this medium with a suitable oxidizing agent. Useful reaction medium-forming diluent (solvents) and useful oxidizing agents are also those hereinbefore described with respect to the process aspects of this invention. Contact of the polymeric materials herein with the oxidizing agent serves to form in-situ within the liquid medium the rigid copolymers which are at least partially epoxidized, e.g., at at least 50% of the residual double bonds therein, in accordance with the procedures hereinbefore described.

Preferably, the diene-derived co-monomers of the elastomeric polymers or copolymers will also be oxidized by the in-situ contact with oxidizing agent. Such contact can serve to at least partially epoxidize, or more preferably hydroxylate, the elastomeric polymers or copolymers at the site of the residual double bonds within such elastomeric materials. Preferably at least some of the hydroxyl groups so formed on such elastomeric materials can be further oxidized to other groups such as esters, ethers or acids.

Once the two types of polymeric materials, rigid and elastomeric, have been suitably oxidized in-situ within the common liquid reaction medium, they can be co-precipitated from the reaction medium to realize the desired functionalized polymeric compositions herein. The oxidized copolymers formed within the oxidation reaction mixture may be recovered therefrom by any suitable conventional separation means. For example, the formed oxidized polymer materials can be co-precipitated from the oxidation reaction mixture using a suitable agent such as methanol and thereafter recovered via filtration. The recovered material can then be further washed, re-precipitated, re-filtered and dried to provide the desired functionalized copolymers in usable form.

Compositions having an appropriate ratio of rigid to elastomeric polymers therein are suitable for melt-molding into useful materials such as structural polyolefin materials having desirable thermal and impact resistance. Such mixtures of polymers will generally exhibit two distinct glass transition temperatures. For example, such compositions can have a first $T_g$ which ranges from about 85° C. to about 260° C. and a second $T_g$ which ranges from about 0° C. to about −95° C. Within such compositions, the weight ratio of rigid olefin/diene copolymer to elastomeric diene-based polymer or copolymer will generally range from about 99:1 to about 50:50. More preferably, the weight ratio of rigid olefin/diene copolymer to elastomeric diene-based polymer or copolymer within such compositions will range from about 95:5 to about 60:40.

Preferred compositions will utilize as the rigid copolymer component, the ethylene/dicyclopentadiene (E/DCPD) materials hereinbefore described with respect to preferred process embodiments herein. Such preferred rigid copolymers have been at least partially epoxidized in-situ within the common liquid reaction medium. Preferred compositions herein will also utilize the preferred elastomeric polymers and copolymers hereinbefore described with respect to the preferred process embodiments herein.

Test Methods and Analytical Procedures

The various parameters and properties used to characterize the polymeric materials described herein can be determined using conventional or well known analytical or testing methodology, procedures and apparatus. For purposes of determining values for the parameters and characteristics provided for the materials of this invention, the following methods and procedures are employed.

Gel Permeation Chromatography (GPC) molecular weights for copolymers reported versus polystyrene are determined using a Waters Associates 2000 Gel Permeation Chromatograph equipped with three Polymer Laboratories mixed bed high-porosity Type LS B columns (10 µm particle size, 7.8 mm inner diameter, 300 mm length) and an internal Waters differential refractive index (DRI) detector. The mobile phase is 1,2,4-trichlorobenzene (degassed and inhibited with 1.5 g/L of 2,6-di-t-butyl-4-methylphenol) at 135° C. (flow rate 1.0 mL/min; typical sample concentration 1.0 mg/mL; 301.5 μL injection loop). Alternately, a Waters Associates 150 C High Temperature Gel Permeation Chromatograph equipped with three Polymer Laboratories mixed bed high-porosity Type B columns (of similar dimensions) and an internal DRI detector can be used. The mobile phase is 1,2,4-trichlorobenzene at 145° C. (flow rate 0.5 mL/min; typical sample concentration 1-2 mg/mL). The DRI signal for EDCPD copolymers exhibits inverted polarity from the signal for homo-polyethylene. Polystyrene standards (17 in total) are used for instrument calibration.

DSC data used to determine thermal properties of copolymers are obtained on a TA Instruments model 2920 or 2910 calorimeter using a scan rate of 10 degrees per minute, typically from −40° C., 25° C., or 50° C. to ≧190° C. (preferably to 250° C.). Some samples are analyzed to 300° C. on the second heat; some epoxy-EDCPD copolymers are analyzed from low temperature (−110 or −125° C.) to 250° C. $T_g$ midpoint values and $T_m$ maximum values reported are from the second heat.

Infrared (IR) spectrometric analysis of copolymers is carried out on thin films cast from $CHCl_3$ (epoxy-EDCPDs) onto NaCl disks, using a ThermoNicolet Nexus 470 spectrometer running OMNIC software.

Solution $^{13}C\{^1H\}$ NMR spectra of polymers are collected in $d_2$-TCE at 120° C. on a Varian UnityPlus 500 spectrometer equipped with a 10 mm broadband probe or a Varian Inova 300 spectrometer equipped with a 10 mm broadband probe. $Cr(acac)_3$ (~15 mg/mL) is used as a relaxation agent.

$^1H$ NMR mol % composition for EDCPD copolymers is determined by integrating the olefin resonances (5.6 and 5.5 ppm, total 2H) and optionally the allylic bridgehead resonance (3.1 ppm, 1H), the non-allylic bridgehead resonance (2.5 ppm, 1H), and the cyclopentenyl $CH_2$ and chain CH resonances (2.2-1.9 ppm, total 4H, when resolved). After correcting the rest of the aliphatic region for DCPD content, the remainder of the aliphatic integral is assigned to ethylene; no corrections are made for cyclohexane solvent. Residual solvent is estimated in weight per cent by integrating the cyclohexane peak at 1.4 ppm (overlapped) versus the total polymer integral. When reported, toluene and residual DCPD monomer contents are calculated using, respectively, the toluene aryl resonances (7.15-7.05 ppm, 5H) and resolved DCPD monomer resonances (norbornene olefin peak just upfield of 6.0 ppm, 1H; 3.25 ppm allylic bridgehead peak, 1H; non-allylic bridgehead and cyclopentenyl $CH_2$, 2.95-2.7 ppm, 3H). The aliphatic integral is also optionally corrected for toluene and DCPD monomer.

$^1H$ NMR mol % composition and per cent functionalization for epoxy-EDCPD copolymers is determined by integrating the epoxy-DCPD CHO resonances (3.4 and 3.3 ppm, total 2H, plus optionally the bridgehead resonances at 2.4 and 2.3 ppm, 2H), any remaining DCPD resonances (olefins at 5.6 and 5.5 ppm, total 2H, and optionally the allylic bridgehead peak at 3.1 ppm, 1H), and any signals from formate hemiester units ([—CH(OH)CH(OC(=O)H)—] units; 8.1-8.0 ppm (CH(OC(=O)H), 1H) and 5.0 ppm (CH(OC(=O)H), 1H)). After correcting the rest of the aliphatic region for epoxy-DCPD, DCPD, and formate hemiester content, the remainder of the aliphatic integral is assigned to ethylene. Ring-opened diol-DCPD units ([—CH(OH)CH(O)H)—] units), when present, are quantified versus epoxy-DCPD units by $^{13}C$ NMR using the CHOH resonance at 76-80 ppm (2 C; after correction for 2 C of formate hemiester [—CH(OH)CH(OC(=O)H)—] unit, if present) versus the epoxy-DCPD CHO resonances (61.2 and 60.1 ppm, 2 C).

EXAMPLES

The preparation and characterization of a number of functionalized olefin-diene copolymers, including terpolymers, in accordance with the process of this invention can be illustrated by the following Examples: (In these Examples, the molar concentrations given are per mole of double bonds within the unsaturated polymeric or copolymeric precursor component.)

Example 1

Reaction of Ethylene/dicyclopentadiene Copolymer and Ethylene/1-octene/4-vinyl-1-cyclohexene Copolymer (50:50) with Hydrogen Peroxide and Formic Acid 1.2835 g of ethylene/dicyclopentadiene copolymer (E/DCPD) containing about 43.6 mole % DCPD (FW 132.20, bp 170° C. 0.00757 moles, $M_n$ 119,000; $M_w$ 213,000) and 1.283 g of ethylene/1-octene/4-vinyl-1-cyclohexene copolymer (E/O/VCH) containing about 13.8 mole % VCH (0.00295 moles) are charged into a reaction flask and dissolved in 200 ml of chloroform. To the polymer solution is added 9.6847 g of formic acid (FW 46.03; 0.2104 mole, 20-fold excess) followed by 1.2522 g of 30% hydrogen peroxide (FW 34.02, 0.01105 moles, 5% excess). The solution is stirred at room temperature for 18 hours. The reaction mixture is poured into 500 ml methanol and the solid precipitate is filtered, washed with methanol, and dried under vacuum (0.1 mm) at 60° C. overnight. The yield of the product is 2.6 g.

The IR spectrum of the products from Example 1 show absorption peaks due to both epoxidized DCPD and ring opened product of E/O/VCH (formate). In the proton spectrum, the unreacted DCPD and VCH can be determined from the olefinic peals at 5.5 (DCPD only) and 5.7 (DCPD and VCH) ppm. The differential between the peak areas is used to calculate the VCH contribution. VCH formate hemiester is quantified from the peaks at 8.1 and 5.1-4.9 ppm. The cluster of peaks from 4.0-3.0 ppm is corrected for contributions from VCH formate, DCPD olefin, and methanol. The residual integral in the region is assigned to DCPD epoxide.

The upfield component of the methyl integral (1.0-0.8 ppm) in the proton spectrum is assigned to hexyl branches from the octene comonomer, and is used to determine the $C_8$ content. After correction for octene, DCPD and VCH contributions, the remaining aliphatic integral is assigned to ethylene.

| Conversion | % Olefin Converted | | |
|---|---|---|---|
| | $^1H$ | $^{13}C$ | Average |
| DCPD → Epoxide | 96.4 | 98.9 | 97.8 |
| VCH → Formate | 98.7 | 100 | 99.4 |

The GPC analysis of the product shows $M_n$ 150,000 and $M_w$ 312,000 (polydispersity $M_w/M_n$ 2.08). The product is completely soluble in solvent suggesting that it is not cross-linked while carrying out the in-situ functionalization. The DSC analysis of the product shows two $T_g$s of the product as 189.11° C. and −17.32° C. The film is clear, suggesting that the components may be compatible but not miscible. The epoxidized E/DCPD copolymer (24576-007) has $T_g$ of 187.26° C.

Example 2

Reaction of Ethylene/dicyclopentadiene Copolymer and Ethylene/1-octene/4-vinyl-1-cyclohexene Copolymer (70:30) with Hydrogen Peroxide and Formic Acid 1.4 g of ethylene/dicyclopentadiene copolymer (E/DCPD) containing about 43.6 mole % DCPD (FW 132.20, bp 170° C. 0.00826 moles) and 0.61 g of ethylene/1-octene/4-vinyl-1-cyclohexene copolymer (E/O/VCH) containing about 13.8 mole % VCH (0.00140 moles) are charged into a reaction flask and dissolved in 200 ml of chloroform. To the polymer solution is added 8.893 g of formic acid (FW 46.03; 0.1932 mole, 20-fold excess) followed by 1.1500 g of 30% hydrogen peroxide (FW 34.02, 0.0101 moles, 5% excess). The solution is stirred at room temperature for 18 hours. The reaction mixture is poured into 750 ml methanol and the solid precipitate is filtered, washed with methanol, and dried under vacuum (0.1 mm) at 50° C. overnight. The yield of the product is 2.22 g.

The IR spectrum of the products from shows absorption peaks due to both epoxidized DCPD and ring opened product of E/O/VCH (formate). The GPC analysis of the product shows $M_n$ 133,000 and $M_w$ 280,000 (polydispersity $M_w/M_n$ 2.16). The product is completely soluble in solvent suggesting that it is not cross-linked while carrying out the in-situ functionalization. The DSC analysis of the product shows two $T_g$s at 186.30° C. and −13.65° C. The film is clear, suggesting that the components may be compatible but not miscible. The epoxidized E/DCPD copolymer has $T_g$ of 187.26° C.

Example 3

Reaction of Ethylene/dicyclopentadiene Copolymer and Ethylene/1-octene/4-vinyl-1-cyclohexene Copolymer (85:15) with Hydrogen Peroxide and Formic Acid 1.7 g of ethylene/dicyclopentadiene copolymer (E/DCPD) containing about 43.6 mole % DCPD (FW 132.20, bp 170° C. 0.01 mole) and 0.31 g of ethylene/1-octene/4-vinyl-1-cyclohexene copolymer (E/O/VCH) containing about 13.8 mole % VCH (0.00075 moles) are charged into a reaction flask and dissolved in 200 ml of chloroform. To the polymer solution is added 9.878 g of formic acid (FW 46.03; 0.2146 moles, 20-fold excess) followed by 1.278 g of 30% hydrogen peroxide (FW 34.02, 0.0113 moles, 5% excess). The solution is stirred at room temperature for 18 hours. The reaction mixture is poured into 500 ml methanol and the solid precipitate was filtered, washed with methanol, and dried under vacuum (0.1 mm) at 50° C. overnight. The yield of the product is 2.4 g.

The GPC analysis of the product shows $M_n$ 122,000 and $M_w$ 250,000 (polydispersity $M_w/M_n$ 2.05). The product is completely soluble in solvent to suggest that it is not cross-linked while carrying out the in-situ functionalization. The DSC analysis of the product shows $T_g$ at 188.66° C. The film is clear, suggesting that the components may be compatible but not miscible. The $T_g$ at the lower temperature is not observed possibly because of small amount of elastomer component in the product. The IR spectra of the products show absorption peaks due to both epoxidized DCPD and ring opened product of E/O/VCH (formate). As the proportion of the elastomer changes from 50:50 to 70:30 and to 90:10 in above three examples the absorption peaks also change.

Example 4

Reaction of Ethylene/Dicyclopentadiene Copolymer and Ethylene/7-methyl-1,6-octadiene Copolymer (70:30) with Hydrogen Peroxide and Formic Acid 2.10 g of ethylene/dicyclopentadiene copolymer (E/DCPD) containing about 43.6 mole % DCPD (FW 132.20, bp 170° C. 0.01239 moles) and 0.90 g of ethylene/7-methyl-1,6-octadiene copolymer (E/MOD) containing about 20.3 mole % MOD (0.003843 moles) are charged into a reaction flask and dissolved in 200 ml of chloroform. To the polymer solution is added 14.9441 g of formic acid (FW 46.03; 0.3247 mole, 20-fold excess) followed by 1.9323 g of 30% hydrogen peroxide (FW 34.02, 0.5797 moles, 5% excess). The solution is stirred at room temperature for 18 hours. The reaction mixture is poured into 750 ml methanol and the solid precipitate is filtered, washed with methanol, and dried under vacuum (0.1 mm) at 50° C. overnight. The yield of the product is 3.29 g.

The GPC analysis of the product shows $M_n$ 106,000 and $M_w$ 196,000 (polydispersity $M_w/M_n$ 1.85). The DSC analysis of the product shows two $T_g$s at 186.43° C. and −8.68° C. The film is clear, suggesting that the components may be compatible but not miscible.

Example 5

Reaction of Ethylene/dicyclopentadiene Copolymer and EPDM Copolymer (70:30) with Hydrogen Peroxide and Formic Acid 2.1 g of ethylene/dicyclopentadiene copolymer (E/DCPD) containing about 43.6 mole % DCPD (FW 132.20, bp 170° C. 0.01239 moles) and 0.900 g of EPDM containing about 3 mole % ethylidene norbornene (0.00067 moles) are charged into a reaction flask and dissolved in 300 ml of chloroform. To the polymer solution is added 12.01964 g of formic acid (FW 46.03; 0.26112 moles, 20-fold excess) followed by 1.5341 g of 30% hydrogen peroxide (FW 34.02, 0.01371 mole, 5% excess). The solution is stirred at room temperature for 18 hours. The reaction mixture is poured into 750 ml methanol and the solid precipitate is filtered, washed with methanol, and dried under vacuum (0.1 mm) at 50° C. overnight. The yield of the product is 3.08 g.

The GPC analysis of the product shows $M_n$ 139,000 and $M_w$ 250,000 (polydispersity $M_w/M_n$ 1.80). The DSC analysis of the product shows one $T_g$ at 174.47° C.

Example 6

Reaction of Ethylene/dicyclopentadiene Copolymer and Ethylene/1-octene/4-vinyl-1-cyclohexene Copolymer (70:30) with Hydrogen Peroxide and Formic Acid 14.0223 g of ethylene/dicyclopentadiene copolymer (E/DCPD) containing about 45.7 mole % DCPD (FW 132.20, bp 170° C. 0.0841 moles) and 6.1919 g of ethylene/1-octene/4-vinyl-1-cyclohexene copolymer (E/O/VCH) containing about 13.8 mole % VCH (0.0142 moles) are charged into a reaction flask and dissolved in 1800 ml of chloroform. To the polymer solution is added 90.5870 g of formic acid (FW 46.03; 1.9680 moles, 20-fold excess) followed by 27.8882 g of 30% hydrogen peroxide (FW 34.02, 0.2460 moles, 5% excess). The solution is stirred at room temperature for 18 hours. The reaction mixture is poured into 6000 ml methanol and the solid precipitate is filtered, washed with methanol, and dried under vacuum (0.1 mm) at 60° C. overnight. The yield of the product is 20 g.

The impact of the material is 1.5 vs. 0.2 for E/NB copolymer (topaz).

Example 7

Reaction of Ethylene/dicyclopentadiene Copolymer and EPDM Copolymer (70:30) with Hydrogen Peroxide and Formic Acid 8.4 g of ethylene/dicyclopentadiene copolymer (E/DCPD) containing about 45.7 mole % DCPD (FW 132.20, bp 170° C. 0.0508 moles) and 3.6 g of EPDM containing about 5 wt % ethylidene norbornene (0.0015 moles) are charged into a reaction flask and dissolved in 500 ml of chloroform. To the polymer solution is added 48.15 g of formic acid (FW 46.03; 1.046 mole, 20-fold excess) followed by 14.82 g of 30% hydrogen peroxide (FW 34.02, 0.13 mole, 5% excess). The solution is stirred at room temperature for 18 hours. The reaction mixture is poured into 2500 ml methanol and the solid precipitate was filtered, washed with methanol, and dried under vacuum (0.1 mm) at 60° C. overnight. The yield of the product is 12.00 g.

The impact of the material is 2.7 vs. 0.2 for E/NB copolymer (topaz).

Example 8

Reaction of Ethylene/dicyclopentadiene Copolymer and Polybutadiene Copolymer (90:10) with Hydrogen Peroxide and Formic Acid 1.8 g of ethylene/dicyclopentadiene copolymer (E/DCPD) containing about 45.7 mole % DCPD (FW 132.20, bp 170° C. 0.011 moles) and 0.2 g of polybutadiene copolymer (36% cis, 55% trans, 9% 1,2, Aldrich, mw 420,000, $T_g$ −95° C.) (0.0037 moles) are charged into a reaction flask and dissolved in 40 ml of chloroform. To the polymer solution is added 13.5 g of formic acid (FW 46.03; 20-fold excess) followed by 4.5 g of 30% hydrogen peroxide (FW 34.02, 5% excess). The solution is stirred at room temperature for 18 hours. The reaction mixture is poured into 500 ml methanol and the solid precipitate is filtered, washed with methanol, and dried under vacuum (0.1 mm) at 50° C. overnight. The yield of the product is 1.93 g.

Example 9

Reaction of Ethylene/dicyclopentadiene Copolymer and EPDM Copolymer (70:30) with Hydrogen Peroxide and Formic Acid 8.4 g of ethylene/dicyclopentadiene copolymer (E/DCPD) ($M_n$ 27000, $M_w$ 75000, $T_g$ 149.1° C.) containing about 39.4 mole % DCPD (FW 132.20, bp 170° C. 0.0508 moles) and 3.62 g of EPDM containing about 5 wt. % ethylidene norbornene (0.0015 moles) are charged into a reaction flask and dissolved in 500 ml of chloroform. To the polymer solution is added 48.15 g of formic acid (FW 46.03; 1.046 moles, 20-fold excess) followed by 14.82 g of 30% hydrogen peroxide (FW 34.02, 0.01371 mole, 5% excess). The solution is stirred at room temperature for 18 hours. The reaction mixture is poured into 2500 ml methanol and the solid precipitate is filtered, washed with methanol, and dried under vacuum (0.1 mm) at 50° C. overnight. The yield of the product is 11.80 g.

What is claimed is:

1. An in-situ formed composition suitable for melt-molding into structural polyolefin material, consisting essentially of:
   A) from 50 to 99 wt %, by weight of the composition, of an epoxidized ethylene-dicyclopentadiene copolymer having:
      i) a dicyclopentadiene-derived monomer content of from about 25 mole % to about 45 mole %;
      ii) a weight average molecular weight of from about 170,000 to about 1,000,000; and
      iii) a glass transition temperature, $T_g$, of from about 85° C. to 260° C.; and
   B) from 1 to 50 wt %, by weight of the composition, of a hydroxylated elastomeric diene-based polymer or copolymer having a glass transition temperature of from about −10° C. to about −80° C.;
   wherein the composition is formed by the process of (i) dissolving in a common liquid reaction medium the ethylene/dicyclopentadiene copolymer and said elastomeric diene-based polymer or copolymer, (ii) contacting the dissolved mixture with an oxidizing agent to generate the epoxidized ethylene-dicyclopentadiene copolymer and the hydroxylated elastomeric diene-based polymer or copolymer, the oxidizing agent comprising a mixture of hydrogen peroxide and formic acid which generates performic acid in-situ within said common liquid reaction medium, and (iii) co-precipitating the epoxidized and hydroxylated copolymer mixture from said common liquid reaction medium as a co-precipitated polymeric composition
   wherein the epoxidized ethylene-dicyclopentadiene copolymer A) comprises oxirane rings at least 97.8% of the sites of the dicyclopentadiene double bonds and the hydroxylated elastomeric copolymer B) comprises diol and/or hydroxyl groups at least 50% of the sites of the diene-derived co-monomer double bonds, wherein the composition has a first $T_g$ value between about 85° C. and about 260° C. and a second $T_g$ value between about 0° C. and about −95° C.; and
   wherein the composition is completely soluble in chloroform at room temperature.

2. The composition according to claim 1, wherein said elastomeric diene-based polymer or copolymer contains from about 5 mol % to about 95 mol % of a $C_2$ to $C_{20}$ α-olefin-derived co-monomer and/or from about 5 mol % to about 85 mol % of ancillary co-monomers which are not α-olefins and which are selected from the group consisting of acyclic, monocyclic and polycyclic mono-olefins containing from about 4 to 18 carbon atoms, in addition to co-monomers derived from dienes.

3. The composition according to claim 2, wherein said elastomeric diene-based polymer or copolymer is an ethylene-propylene-diene copolymer rubber, an ethylene-α-olefin-diene copolymer rubber or a propylene-α-olefin-diene copolymer rubber wherein the α-olefin in said copolymer rubbers is selected from the group consisting of 1-butene, 1-pentene, 1-hexene, 4-methyl-1-pentene, 1-octene and 1-decene, and wherein the diene in said copolymer rubbers is selected from the group consisting of 1,4-hexadiene; 1,6-octadiene; 2-methyl-1,5-hexandiene; 6-methyl-1,5-heptadiene; 7-methyl-1,6-octadiene; cyclohexadiene; dicyclopentadiene; methylterahydroindene; 5-vinylnorbornene;

5-ethylidene-2-norbornene; 5-methylene-2-norbornene; 5-isopropylidene-2-norbornene; 6-chloromethyl-5-isopropenyl-2-norbornene; 2,3-diisopropylidene-5-norbornene; 2-ethylidene-3-isopropylidiene-5-norbornene; and 2-propenyl-2,2-norbornadiene.

4. The composition according to claim 2, wherein said elastomeric diene-based polymer or copolymer is a flexible aromatic vinyl random or block copolymer selected from the group consisting of (a) styrene-butadiene copolymer rubbers, (b) styrene-butadiene-styrene copolymer rubbers, (c) styrene-isoprene block copolymer rubbers, and (d) styrene-isoprene-styrene block copolymer rubbers.

5. The composition according to claim 1, wherein at least some of the hydroxyl groups formed on said hydroxylated elastomeric diene-based polymer or copolymer are further oxidized to ester groups by contact with said oxidizing agent.

6. The composition according to claim 1, wherein said common liquid reaction medium comprises an organic diluent.

7. The composition according to claim 6, wherein said organic diluent is selected from the group consisting of toluene, chloroform and perfluorinated alcohols.

* * * * *